(12) United States Patent
Cheng et al.

(10) Patent No.: US 7,912,902 B2
(45) Date of Patent: Mar. 22, 2011

(54) APPLICATION SERVICE PEERING AND AGGREGATION

(75) Inventors: Kong Cheng, Mendham, NJ (US);
Benjamin Falchuk, Upper Nyack, NY (US); Vito Jokubaitis, Chester, NJ (US);
Fuchun J. Lin, Morris Plains, NJ (US);
Robert Pinheiro, Westfield, NJ (US)

(73) Assignee: Telcordia Licensing Company, LLC, Piscataway, NJ (US)

( * ) Notice: Subject to any disclaimer, the term of this patent is extended or adjusted under 35 U.S.C. 154(b) by 993 days.

(21) Appl. No.: 10/779,058

(22) Filed: Feb. 13, 2004

(65) Prior Publication Data
US 2005/0033808 A1  Feb. 10, 2005

Related U.S. Application Data

(60) Provisional application No. 60/447,200, filed on Feb. 13, 2003.

(51) Int. Cl.
  *G06F 15/16* (2006.01)
  *G06F 9/44* (2006.01)
  *G06F 3/00* (2006.01)
(52) U.S. Cl. ......... 709/205; 709/202; 717/171; 719/317
(58) Field of Classification Search .................. 717/171; 709/219, 201, 202
See application file for complete search history.

(56) References Cited

U.S. PATENT DOCUMENTS

| | | | |
|---|---|---|---|
| 6,286,047 B1 * | 9/2001 | Ramanathan et al. | 709/224 |
| 6,513,059 B1 * | 1/2003 | Gupta et al. | 709/202 |
| 6,580,916 B1 * | 6/2003 | Weisshaar et al. | 455/456.1 |
| 6,621,895 B1 * | 9/2003 | Giese | 379/201.03 |
| 6,640,238 B1 * | 10/2003 | Bowman-Amuah | 709/201 |
| 6,711,157 B1 * | 3/2004 | Tang et al. | 370/352 |
| 6,910,074 B1 * | 6/2005 | Amin et al. | 709/227 |
| 6,954,790 B2 * | 10/2005 | Forslow | 709/227 |
| 7,013,290 B2 * | 3/2006 | Ananian | 705/27 |
| 7,069,291 B2 * | 6/2006 | Graves et al. | 709/201 |
| 7,263,551 B2 * | 8/2007 | Belfiore et al. | 709/219 |
| 7,401,057 B2 * | 7/2008 | Eder | 706/20 |
| 7,496,652 B2 * | 2/2009 | Pezzutti | 709/223 |
| 7,602,723 B2 * | 10/2009 | Mandato et al. | 370/236 |
| 7,630,986 B1 * | 12/2009 | Herz et al. | 707/10 |
| 7,647,392 B2 * | 1/2010 | Sharma et al. | 709/223 |
| 2002/0093980 A1 * | 7/2002 | Trebes, Jr. | 370/466 |
| 2002/0143906 A1 * | 10/2002 | Tormasov et al. | 709/220 |
| 2002/0165745 A1 * | 11/2002 | Greene et al. | 705/7 |
| 2002/0176404 A1 * | 11/2002 | Girard | 370/352 |

(Continued)

*Primary Examiner* — William C Vaughn, Jr.
*Assistant Examiner* — Muktesh G Gupta
(74) *Attorney, Agent, or Firm* — Fitch Even Tabin & Flannery (57) ABSTRACT

Service applications at one or more service providers are bundled through a server thereby creating new services. The server comprises service agents, each of which corresponds to one or more service applications and proxies for its application(s) to perform service bundling. When a subscriber interacts with a service application and affects service specific data, the application sends this data along with the subscriber's intent with respect to this data to the server. The server next identifies a primary service agent, which is the agent proxying for the application. This agent determines a peer group of service agents, wherein each peer agent corresponds to a service application that together define a bundled service. The principal and peer agents subsequently negotiate/coordinate with respect to the service data. As a result, the agents may communicate with their respective service applications to determine a subscriber's current service data configurations and/or to update these configurations.

21 Claims, 4 Drawing Sheets

U.S. PATENT DOCUMENTS

| | | | |
|---|---|---|---|
| 2002/0178127 A1* | 11/2002 | Byde et al. | 705/80 |
| 2003/0028451 A1* | 2/2003 | Ananian | 705/27 |
| 2003/0120502 A1* | 6/2003 | Robb et al. | 705/1 |
| 2003/0172145 A1* | 9/2003 | Nguyen | 709/223 |
| 2003/0217125 A1* | 11/2003 | Brancati et al. | 709/220 |
| 2004/0030741 A1* | 2/2004 | Wolton et al. | 709/202 |
| 2008/0086564 A1* | 4/2008 | Putman et al. | 709/227 |

* cited by examiner

APPLICATION SERVICE PEERING AND AGGREGATION

CROSS-REFERENCE TO RELATED APPLICATIONS

This application claims the benefit of U.S. Provisional Application No. 60/447,200, filed Feb. 13, 2003, the contents of which are incorporated herein by reference.

FIELD OF THE INVENTION

Our invention relates generally to application service integration. More particularly, our invention relates to methods and systems for integrating/bundling service applications through the use of autonomous service agents that cooperate on behalf of the applications to perform the integration/bundling.

DESCRIPTION OF THE BACKGROUND

In the world of Next Generation Networks (NGNs) (e.g. high speed IP-based networks), network operators and service providers are increasingly faced with the challenge of determining which new services can be marketed and made profitable, and then rapidly deploying these new services. Traditionally, service providers have independently developed and delivered new services themselves. However, this intra-provider service delivery paradigm involves a lengthy cycle of creating a service from scratch, deploying and provisioning the service into the network, and operating the service accordingly. As can be seen, a fundamental deficiency in this paradigm is that a service provider needs to go through all phases in the delivery lifecycle in order to generate new revenue. For a service provider, there are inherent delays and costs between service-inception and service operation, whether the service is developed internally or outsourced by a third party. In addition, there is no guarantee that the service will be accepted by the market or generate the necessary revenue to sustain it once operational. Overall, this approach requires that service providers make substantial upfront investments in new services and take on considerable risk when deploying new services.

Nonetheless, there are many service providers today, each with their own administrative domains, providing many different services to the subscribers of that domain. As a result, service providers are adopting a new business model for delivering new and value-added services to subscribers that has the potential to substantially reduce the time to market and risk associated with introducing such services themselves.

Specifically, subscribers today may have multiple service providers and/or multiple services within and across these providers but see no consistency and aggregation among the services. As a result, service providers are providing new services by bundling multiple distributed services both within and across service provider domains. When a service provider bundles a third party's already operational and profitable or popular service with its own, the provider decreases time to market and increases its probability of market acceptance. This approach also minimizes risk from erroneous analysis of service marketability, and how to deploy, operate, and maintain new services for profitability.

However, while this new model is proving successful, the current methods for bundling/combining services are highly customized and achieved through point-to-point software integration that tends to require laboriously crafted arrangements between the providers. The result is new services that require extensive bi-lateral negotiation and integration, resulting in the tight coupling of existing services.

For example, one existing service integration technique, called the generic application integration approach, requires two applications/systems/enterprises to message through a queued integration framework. Specifically, messages from a first service application are transmitted to the framework, queued, transformed multiple times, and eventually forwarded to the receiving service application in a format that the receiving application readily understands. In a second approach, called the API approach, two applications/systems/enterprises communicate through well-defined and controlled programmatic interfaces that specify all parameters and formats. In this approach, transformation is not generally required since the receiving application simply enforces formatting through the interface it offers to other systems. However, a shortcoming of this approach is that if the interface semantics or syntax changes, all calling systems will also be affected, causing a costly cascade of modifications.

As can be seen, these existing techniques essentially require expensive point-to-point integrations resulting in "n×n" interfaces (assuming there are "n" service applications). In addition, the bundled services typically lack any type of coordination and control between each other. Furthermore, the central control logic of each service application typically has to be customized for each interconnection, creating tightly coupled systems. In addition, because each of the bundled services is expected to function both as a standalone application and as a single component of an integrated application, and because the integration affects the central control logic, the nature of integration is constrained to the actual "workflow" engine of these applications. These drawbacks also limit the number of service applications that can be bundled.

For NGN service providers, service integration approaches such as these are not ideal. Although the approaches create an environment for creating new services, these new services are comprised of tightly coupled existing services making these new services inflexible and making the deployment of these new services difficult to change. In the NGN service provider world, which is characterized by the rapid introduction and removal of dynamic services, this is not acceptable.

SUMMARY OF OUR INVENTION

Accordingly, it is desirable to provide methods and systems that overcome the shortcomings of the prior art and bundle service applications without having to actually modify the application service logic. In accordance with our invention, service applications both within and between service providers are bundled through a server (referred to as the "service peering aggregation server" (SPAS server)), thereby creating new services. Importantly, the SPAS server bundles service applications through the applications' service specific data, rather than through the service applications' service logic. In other words, from the standpoint of our invention, when a subscriber interacts with a service and affects service specific data, a "service event" has occurred. When a service application detects such an event from a subscriber, it forwards this event to the SPAS server, which operates on this event/data to perform service integration.

Specifically, the SPAS server comprises a service bus agent, a plurality of service agents, and a user preference and profile agent (UPPA). The service bus agent acts as a communications interface between the external service applications that are to bundled and the SPAS server, performing protocol translations and routing message between the SPAS server components and these applications.

The service agents perform the actual service integration for the SPAS server. Each agent proxies for one or more service applications and performs the service integration for its corresponding application(s). In particular, each agent understands a set of fundamental communication patterns and also understands sufficient information about the specifics of the service application(s) it represents. Through these basic communication patterns and understanding of the service applications, the service agents autonomously communicate/coordinate with one another with respect to a particular service event in order to perform service integration.

The UPPA, through the use of a database, provides two main functions. First, the SPAS server uses the notion of "peer groups" to define bundled services of external service applications. Each peer group defines a logical association between service agents and thereby an association of service applications. Importantly, rather than maintaining these associations within the service agents themselves, the UPPA maintains these associations within a database. The second function the UPPA performs is to maintain preference and profile information for each subscriber who subscribes to a bundles service, for example, it will maintain conflict resolution information. Specifically, when service agents are coordinating with respect to a service event, they may have conflicting service data. The UPPA will maintain subscriber preferences and priorities between applications that can be used by the service agents to resolve such conflicts.

Accordingly, when a service application detects a service event for a given subscriber, the service application will forward a message to the service bus agent wherein the message comprises the service event along with the subscriber's intent with respect to this service event. When the service bus agent receives this service event, it determines the service agent that proxies for the service application (which agent is referred to as the primary service agent because it receives the initial notification) and then forwards the event to this agent.

When the principal service agent receives a service event from its corresponding service application, the service agent will contact the UPPA to determine a peer group of associated service agents (and thereby external service applications to which a subscriber subscribes) that may care about the service event in question. This service agent may also query the UPPA to determine the preferences of the subscriber that generated the service event so that these preferences can be taken into account during service integration. Based on this information, the principal service agent and peer service agents subsequently coordinate and negotiate with respect to the service event in question using a set of well defined interaction patterns. As a result of these interactions, one or more of the service agents may communicate with their corresponding service applications to determine a subscribers current service information. In the end, the service agents may communicate with their corresponding service applications to configure/update service information, thereby achieving the integration.

DETAILED DESCRIPTION OF OUR INVENTION

Figure 1:
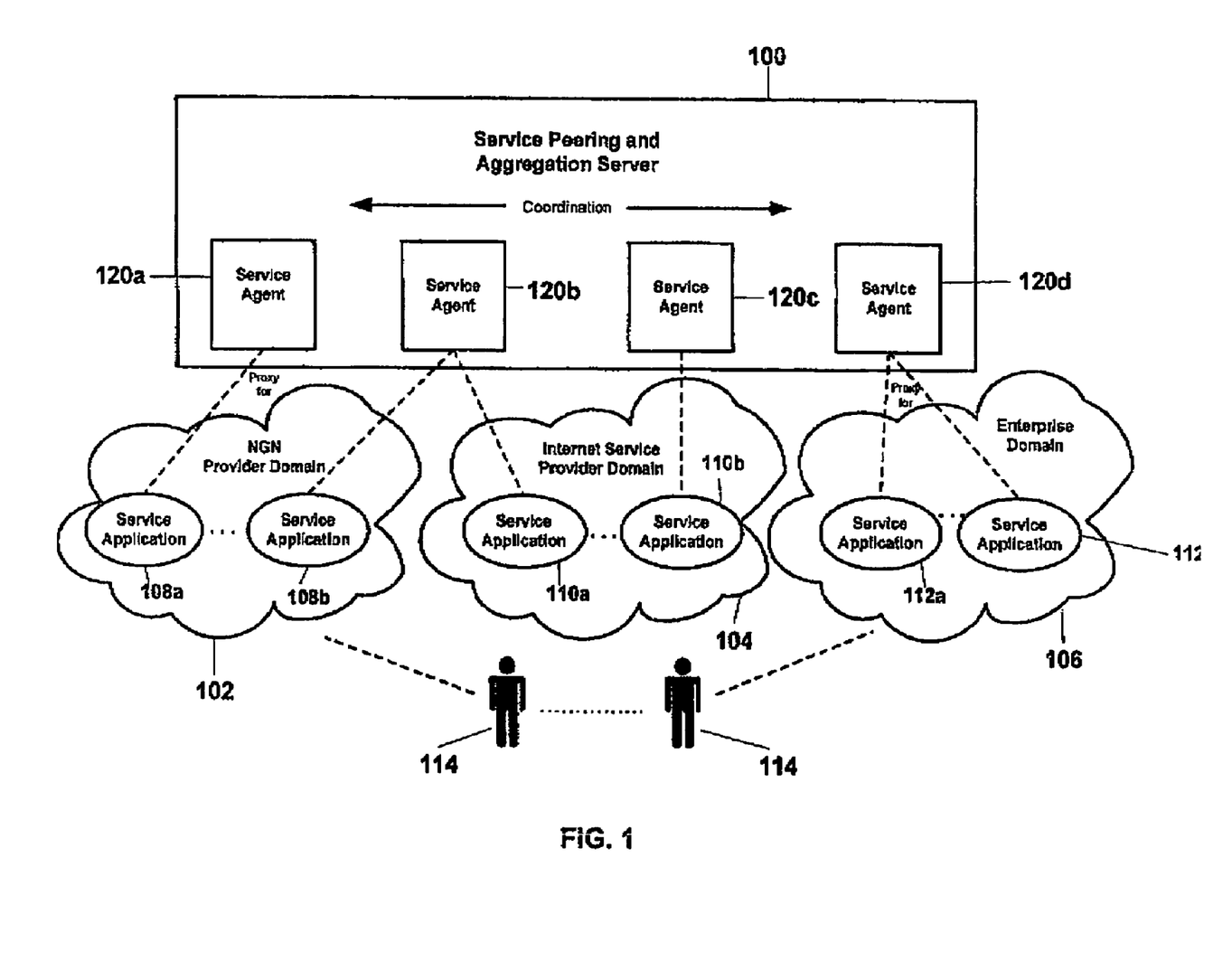
FIG. 1 is a high-level illustrative architecture of our SPAS server for bundling distributed service applications to create new services.

FIG. 1 is high-level illustrative diagram of the "service peering and aggregation server" 100 (SPAS server) of our invention for bundling distributed service applications to create new services. SPAS 100 is a software and protocol based system that executes on one or more computer platforms, as further described below. SPAS 100 resides in an environment consisting of one or more service providers 102, 104, and 106 (e.g., NGN providers, ISP's, enterprise networks, PSTN and wireless providers, etc.) each with its own domain and each providing its own set of services 108a/b, 110a/b, and 112a/b to its subscribers 114. Without the SPAS server, subscribers will use multiple services both within and between multiple service providers but will not see any aggregation or coordination between these services. The SPAS server comprises a plurality of services agents 120a-d each of which proxies for one or more service applications 108-112 (as shown by the dashed lines). Together, these service agents interact/negotiate with one another to enable the bundling of a subscriber's service applications both within and between the service providers to thereby achieve a desired combined behavior. As such, subscribers who now subscribe to individual services can also subscribe to new services that are essentially "service bundles". These service bundles are the aggregation of the individual services, whether offered by a single or multiple service providers, to which the subscriber subscribes.

Significantly, a service application's behavior is characterized by its service logic (i.e., control logic) and service specific data. Accordingly, service application behavior for integration purposes can be affected by altering the service control execution, which is how the prior art systems perform integration, or by altering the service/configuration data. We have observed, however, that changing and/or configuring this service specific data can directly affect most service application behaviors. As such, service integration in accordance with our invention is directed at integrating service applications from the perspective of their service specific data rather than directly integrating their control logic.

As such, from the standpoint of our invention, when a subscriber of a service interacts with that service and affects service specific data, a "service event" has occurred. When a service application detects an event from a subscriber, it forwards this event to the SPAS server. Importantly, it is the decision of the developer of the service application and/or service provider to decide which aspects of an application are open for integration. Accordingly, not all events that can be classified as "service events" have necessarily been sent to the SPAS server.

Assuming the application is designed to report the event, the application sends a message to the SPAS server identifying itself (i.e., the specific service), the subscriber, service specific data surrounding the service event, and some action primitive effectively informing the SPAS server of the intent of the service event. For example, assume a subscriber subscribes to a calendar service and enters a new appointment. This is a service event. The calendar service may send a message to the SPAS server identifying the service, the subscriber, the new appointment, and a "create" command, indicating that the subscriber wishes to enter the new appointment (these concepts are further explained below).

For each service application that is bundled through the SPAS server 100, there is a corresponding service agent 120a, 120b, 120c, 120d at the server that proxies for the application. Each service agent 120a, 120b, 120c, 120d for a given service application 108a, 108b, 110a, 110b, 112a, 112b runs autonomously from the other agents and embodies the service integration logic, which logic is directed at performing service integration from the perspective of service events. When the SPAS server 100 receives a service event, it identifies the specific service agent that is proxying for this service application, which service agent is referred to as the principal agent here because it receives the initial notification. The SPAS server also embodies the notion of "peer groups", which is a logical association between service agents. In other words, each service agent in a peer group corresponds to an external service application and together, these service applications comprise a set of bundled integrated services. From the standpoint of our invention, these peer groups are defined by service providers (who indicate which services should or should not be bundled) and subscribers (who indicate which of the services they subscribe to should be bundled). As an example, peer groups can be subscriber-driven. For each subscriber who subscribes to service bundling through the SPAS server, there is a corresponding peer group of service agent members each of which corresponds to an external application service that a subscriber wants bundled.

Accordingly, when the principal service agent is notified of a service event, it identifies the other service agents, called peer service agents, through the peer groups. Again, these service agents represent services that the subscriber also subscribes to and to whom this service event is relevant. The principal service agent then forwards the event to these peer service agents, and subsequently, the principal and peer service agents coordinate, negotiate, and interact based on some service logic directed at the service event. As a result of these interactions, the principal and/or peer service agents may in turn communicate back with their corresponding service application(s) at the service provider(s) and affect service data for the subscriber. For example, one of the peer service agents may determine through interactions with its corresponding service application that there is a conflicting appointment due to the new appointment and may instruct the application to remove the conflicting appointment. Similarly, the principal service agent for the calendar service may determine from its interactions with the peer agents that the subscriber cannot make the new appointment. As such, the principal service agent may report back to the calendar service that that the new appointment needs to be "denied." Importantly, note that unlike the prior art, the interaction here is between the service agents and the real service data, and not between the service logic within the service applications themselves.

Significantly, contrary to prior methods for bundling services, the SPAS server reduces the current many-to-many integration approach to a many-to-one integration paradigm and in particular, moves the service integration logic from the bundled service applications to the multiple distributed service agents thereby minimizing/avoiding having to modify the logic of the existing service applications and allowing the aggregation of services not explicitly designed to interoperate. As a result, service applications are loosely coupled, simplifying the bundling and unbundling process and allowing for greater numbers of applications to be simultaneously bundled. In addition, because the integration service logic is removed and separate from the bundled application, arbitrarily complex integration logic can be developed that is beyond the "workflow" engines of the service applications themselves. Alternatively, a pre-defined set of templates (logic) can be instantiated to rapidly add new services to a bundle without extensive customization. In addition, it should be further noted that the addition and/or removal of the SPAS server 100 does not fundamentally change the independent behavior of the existing services. If the SPAS server were to fail, a service application's interaction with the server will simply time-out and the application will proceed to execute as normal.

Figure 2:
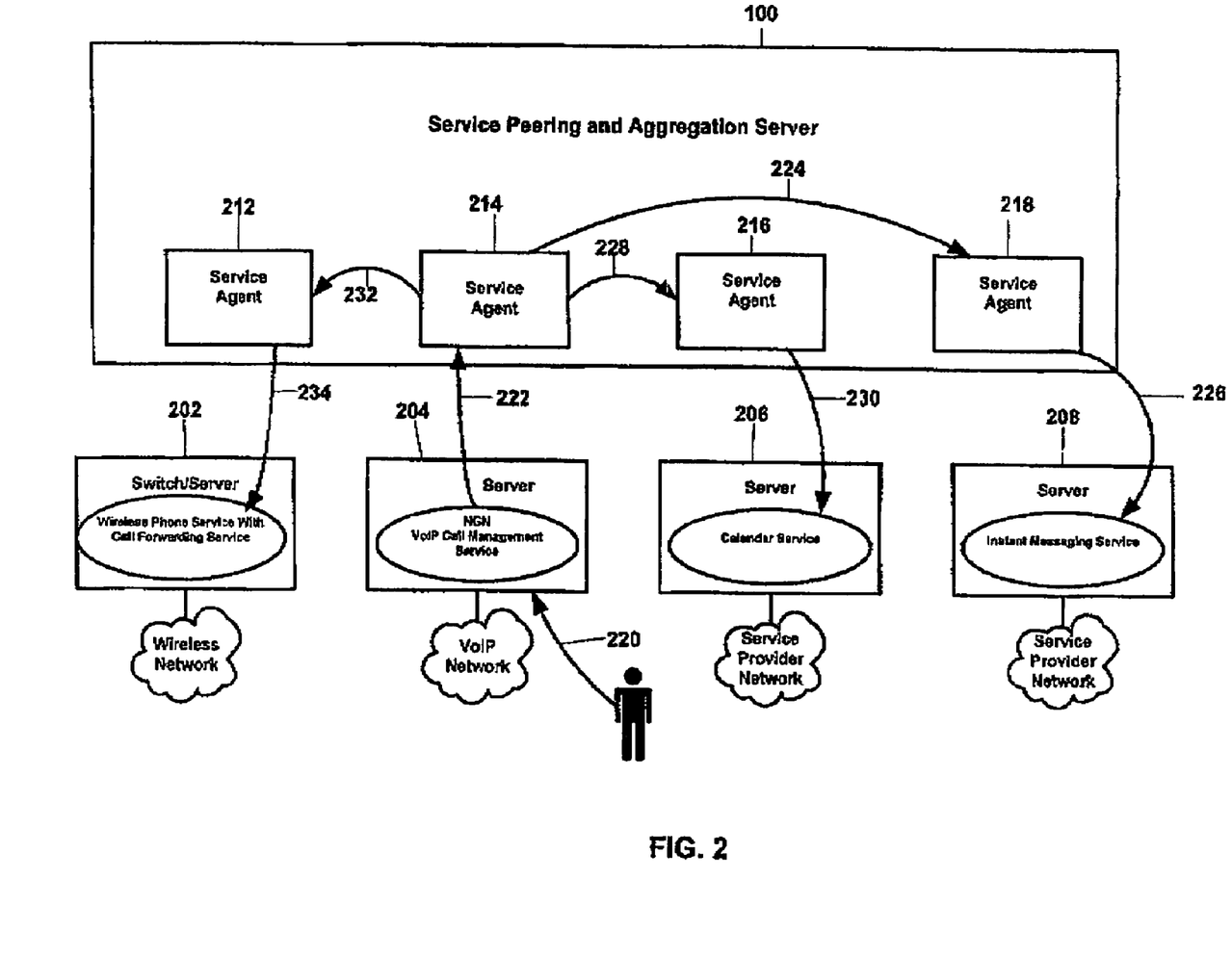
FIG. 2 is an exemplary flow diagram illustrating how our SPAS server can bundle diverse service applications to create new services.

An example bundled service realized through our invention will help further show how we integrate services, which example is shown in FIG. 2. Assume the services or service applications to be bundled/aggregated are a wireless phone service with call forwarding (202), an NGN VoIP Call Management (CM) service (204), a Calendar (CAL) service (206), and an Instant Messaging (IM) service (208). One example of an aggregated bundle service comprising these services is a presence-based service that provides management of status or availability information, as well as logging of selected service events. In overview, the Instant Messaging (IM) service (208) provides a text messaging capability between subscribers and also provides the management of each subscriber's presence status. As indicated, a service need only expose a portion of its service data for bundling. In this example, the exposed interaction for bundling only involves propagation of the presence information (i.e. available and unavailable status) between the SPAS server 100 and the IM service 208. The NGN VoIP Call Management (CM) service (204) provides management of VoIP calls. In this example, only the busy (i.e., offhook) and idle (i.e., onhook) status of the service are exposed for interaction with other services in the bundle. As for the wireless phone service (202), the call forwarding feature forwards calls when the subscriber is busy. Again, only the busy (i.e., offhook) and idle (i.e., onhook) status of the service 202 are exposed for interaction with other services (204, 206, 208) in the bundle. When a subscriber's call status is set to busy (either from the wireless network or from interaction with bundled services), incoming calls are automatically forwarded to an alternate telephone number. Finally, the Calendar (CAL) service (206) allows a user to schedule appointments or to log events of interest. In this example, the Calendar service 206 acts as a logging service that records specific events generated by the service bundle.

Assume a subscriber 210 subscribes to all four services (202, 204, 206, 208) and to a bundled service (not shown) that manages presence information. Assume further that the SPAS server is configured such that all four services constitute a peer group with respect to the subscriber. First, assume the subscriber picks up the VoIP phone to make a call (step 220). The CM service 204 propagates the off-hook event (i.e., service event) to the SPAS server 100, which forwards the event to the service agent 214 proxying for the CM service (step 222). In this case, the integrated service is such that the off-hook event is interpreted by the SPAS server (via subscriber or system preferences) that the subscriber 210 does not want to be disturbed, which translates to a "busy" event for the CAL service 206, a "busy" event for the wireless service 202, and an "unavailable" event for the IM service 208. Accordingly, the CM service agent 214 informs the service agent 218 proxying for the IM service about the "busy" event from the CM service (step 224). The IM service agent in turn communicates with the IM service 208 to change the IM status of the subscriber to unavailable (step 226). Next, the CM service agent 214 informs the service agent 216 proxying for the CAL service 206 about the "busy" event from the CM service 204 (step 228). The CAL service agent 216 in turn communicates with the CAL service 206 to schedule a "busy" note, accordingly (step 230). Finally, the CM service agent 214 informs the service agent 212 proxying for the wireless service (202) about the "busy" event from the CM service (step 232). The wireless service agent in turn communicates with the wireless service 202 to schedule a "busy" event (step 234), which in turn causes the activation of the call forwarding service.

Figure 3:
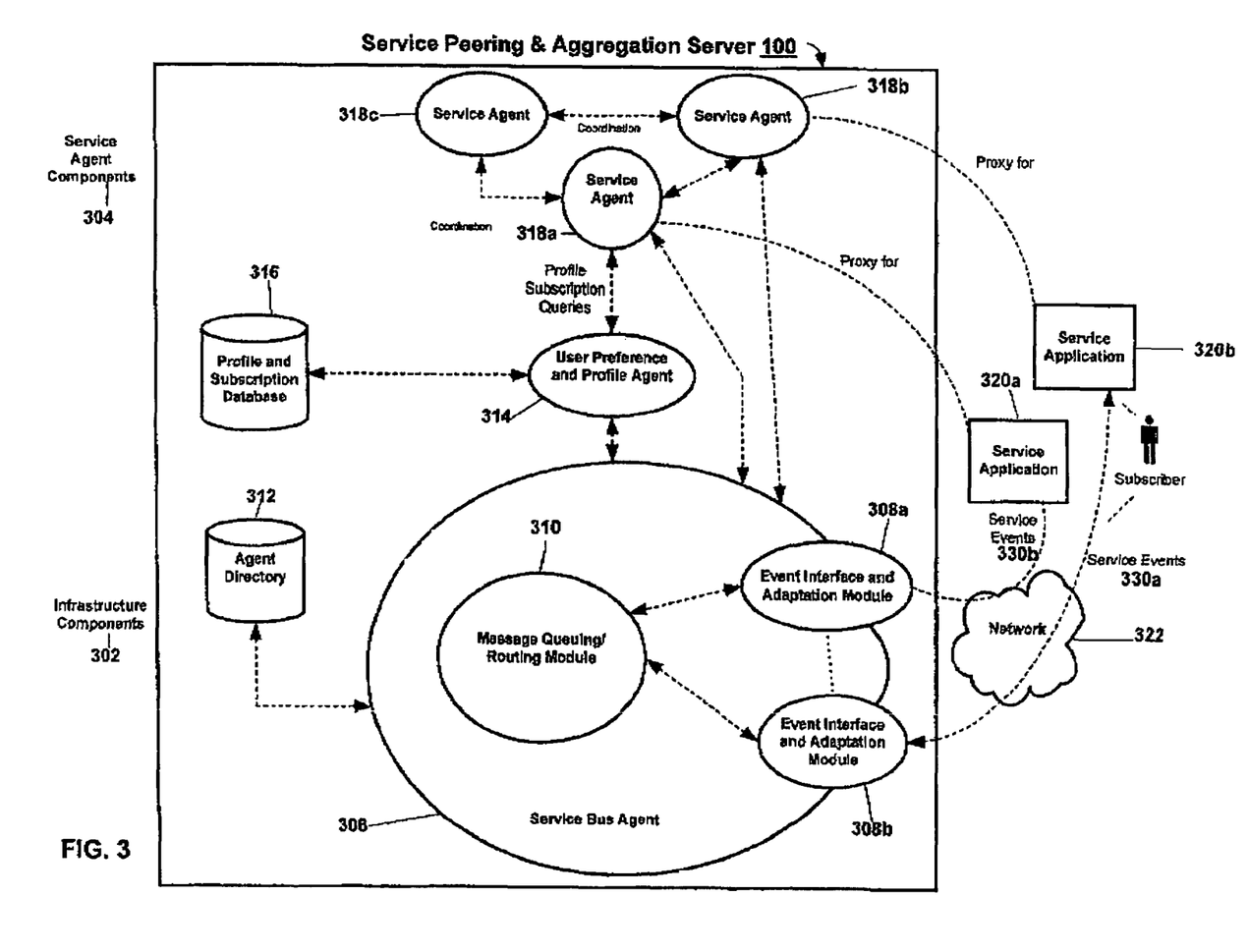
FIG. 3 is an illustrative functional architecture of our SPAS server.

We turn now to a detailed description of our invention. FIG. 3 shows a functional architecture of the SPAS server 100. The components of the server can be logically divided into infrastructure components 302, which ensure the stable and consistent operation of the system as a whole, and service agent components 304, which implement functions specific to service proxying and agent interactions. More specifically, the infrastructure components comprise a service bus agent 306, which includes a plurality of "event interface and adaptation" (EIA) modules 308a-b and a "message queuing/routing" module 310, an agent directory 312, a "user preference and profile agent" (UPPA) 314, and a "profile and subscription" database 316. The service agent components comprises a plurality of service agents 318a-c each of which proxies for one or more service applications 320a-b as discussed above. The following will begin by briefly describing the functions of these components and how they interact. It will then describe in detail the protocols these components use to communicate. Once these protocols are explained, a detailed description of the components will be provided.

The service bus agent 306 in conjunction with the agent directory 312, serves as an information bus bridging the communications between the external service applications 320 and the service agents 318. More specifically, the service bus agent performs several functions. First, the service bus agent (through an EIA module 308) manages the specific communications interface for the SPAS server between each service application over network 322 and in particular, conforms to the network and transport layer protocols each application may be using to communicate with the SPAS server 100.

Second, the service bus agent 306 performs protocol-mapping functions. Specifically, as a service application 302a, 306b generates service events 330a, 330b, it sends service event data to the SPAS server 100. As further described below, we define a preferred protocol and format for defining these events; however, others can be used. Nonetheless, this preferred protocol and format are also used within the SPAS server 100. Accordingly, the service bus agent 306 (through an EIA module) maps the format used by the service application 320a, 320b to define service events 330a, 330b, to the well-defined format understood by the SPAS components. In addition, as service agents 318a-c communicate back to their service applications 320a, 320b, the service bus agent 306 again will perform the necessary mapping functions.

Third, in conjunction with the agent directory 312, the service bus agent 306 performs message routing. Specifically, the agent directory provides a naming function for relating/mapping between external service applications and the service agents 318a-c. As such, as the service bus agent 306 receives a service event message from a service application 320a-c, uses the agent directory to map the message to a corresponding service agent 318a-c to which the message is intended, and then routes the message accordingly. Similarly, as service agents 318a-c generate messages for the external service applications 320a, 320b, the service bus agent 306 may use the agent directory to locate an EIA module 308 that will allow the service agent 318a-c to communicate with the external service. Finally, as the service bus agent 306 performs these routing functions, it also queues the messages as they await reception/transmission (through the message queuing/routing module 310).

The UPPA 314 in conjunction with the "profile and subscription" database 316 acts as repository of user and service related information for all subscribers of SPAS aggregated services. In particular, the UPPA oversees the management of the database 316 and acts as an interface to this database 316. The UPPA provides two essential functions. First, the UPPA maintains service subscription information. As described earlier, the SPAS server 100 uses the notion of "peer groups", which are logical associations between service agents 318a-c, to define bundled services of external service applications 320a, 320b. Rather than maintaining this notion within the service agents 318a-c themselves, the UPPA maintains these associations within the database 316. Accordingly, when a service agent (i.e., the primary service agent) receives a service event from its corresponding service application, the service agent will contact the UPPA to determine a peer group of associated service agents (and thereby external service applications to which a subscriber subscribes) that may care about the service event in question. Once knowing the peer group, the primary service agent will communicate with the other service agents in the group.

The second function the UPPA 314 performs is to maintain preference and profile information for each subscriber who subscribes to a bundles service. Specifically, each subscriber to a bundled service may have particular preferences. In addition, it is possible for conflicts to arise between bundled service applications (e.g., two calendar type applications each shows an appointment for a given subscriber for the same time/date). The UPPA will maintain priorities between applications, again, based on a subscriber's preference, that can be used to resolves such conflicts. Accordingly, service agents will access this preference/profile information from the UPPA and use this information when negotiating over a particular service event. As an aside, it should be noted that by accessing the UPPA (e.g., through a Web interface), subscribers and service providers can configure the SPAS services. Specifically, by modifying the UPPA, subscribers can customize which service applications should be bundled and can customize their profile. Similarly, the service provider of an application can determine which applications may or may not be part of bundled services.

Turning to the service agents 318a-c, as indicated, each proxies for or shadows an external service application 320a-b and performs service integration on behalf of its application. As further described below, each service agent understands a set of fundamental communication patterns and also understands sufficient information about the specifics of the service application each represents. These basic communication patterns and understanding of the service applications allows the service agents to autonomously communicate in order to bundle services.

As indicated, when a service event enters the service bus agent 306, the service bus agent routes the message to an initial service agent, which is called the primary service agent. This service agent will communicate with the UPPA 314 to determine peer service agents and may also query the UPPA to determine the preferences of the subscriber that generated the service event so that these preferences can be taken into account. Based on this information, the principal service agent and peer service agents will coordinate and negotiate to bundle the services. As part of this operation, one or more of the service agents 318 may communicate with their corresponding service applications 320 to determine and/or configure service information.

Having described the basic interaction of the SPAS components, we next turn to the communication protocols of the system. The SPAS server essentially consists of two categories of communication interfaces, the interface between the service applications and the SPAS server and the interfaces between the components of the SPAS server. With respect to the first interface, service applications will generate messages to the SPAS server reporting service events and will receive messages from the SPAS server regarding service events (i.e., either events locally generated by the application or events generated by remote applications within a service bundle). With respect to the second interface, service agents will generate messages between themselves and the infrastructure components in order to perform service aggregation.

To achieve unification across diverse services and providers, it is necessary for all entities to share an understanding of message formatting and semantics. Accordingly, we utilize a layered protocol approach. Specifically, we define an application layer protocol stack consisting of two protocols: the "Service Data Description Protocol" (SDDP) and the "Service Negotiation and Control Protocol" (SNCP). SDDP is a format and protocol for encapsulating/describing service events and for describing the intent of a service event. SDDP is the preferred protocol for conveying service events between the SPAS components, although other protocols/formats can be used (regardless, a consistent protocol is required). Preferably, service applications also use SDDP when communicating with the SPAS server. However, as indicated above, each service application may use a different protocol in which case, the service bus agent performs a mapping function to/from SDDP. The remainder of this discussion assumes that both service applications and the SPAS server use SDDP.

SNCP is a protocol that describes the possible interaction behaviors of the SPAS components, and enables the service agents to perform basic negotiation, to control service events, and to behave in an autonomous fashion. The payload of SNCP messages is typically the SDDP message format. Advantageously, this layered approach to SDDP/SNCP separates the syntax and semantics of the two key concerns: service specific descriptions, and service agent interaction patterns.

Hence, a service event from an external service application is propagated to the SPAS server in SDDP format. This message captures specifics of the service event, the intent of the service event from the perspective of the application, the subscriber identification, etc. As the SPAS server receives this message, it parses it, generates an SNCP message with the service event (in SDDP message format) as payload, and relays the SNCP message to an internal service agent. This agent then communicates with other service agents and SPAS components using SNCP messages.

Note that the semantics of SNCP capture communicative intent between the SPAS components and enables the agents to perform high-level interaction patterns to, for example, query one-another and negotiate with one another. The subject matter of these interaction patterns is the SNCP payload itself, which as just described, is an SDDP message containing a service event and an intent of this service event from the perspective of the sender of the message. Accordingly, service agents will analyze the SDDP portion of the message and in particular, will analyze the service event and the intent of this service event from the perspective of the sender. As such and depending on how the service agents are programmed, the service agents may simply propagate an initially received SDDP message, and/or may actually modify and create new SDDP messages during their discourse in order to further specify a service event and an intent from the perspective of the sending agent. Regardless of the actual interaction, as service agents reach a resolution on a given service event, they generate outgoing SDDP responses to one or more of the aggregated services. Note that SNCP is relevant only within the SPAS server whereas SDDP is understood by external calling services and between the SPAS components.

More specifically, SDDP is preferably an XML-based representation for service data. The SDDP message is divided into two main parts: header metadata and service specific data (i.e., the service event details—for example, if the service event corresponds to a calendar appointment, then the service specific data may include the appointment's starting time, duration, and description). The header metadata currently defined includes: (i) event operation type, (ii) subscriber identification, (iii) requested-by identification, (iv) service provider identification, (v) service identification, (vi) request priority, (vii) response type indicator, (viii) response message, and (ix) timestamp. Note that not all of these metadata are required in an implementation and similarly, new metadata can be added if the need arises when introducing new services. As for the service specific data, again, standardized forms (again, preferably XML-based representations) are needed such that the service applications and service agents can logically communicate. Accordingly, information models are used to capture service specific data. (Again, the exact models are not specific to our invention.) However, because service events can be one of many types, the service specific data portion of the SDDP message is not restricted to a single schema. Instead, any one of a set of service-type-specific schemata may be instantiated. As can be seen, the SDDP message format provides two functions. First, through the service specific data field, the message conveys service events between service applications and the SPAS server and between service agents. Second, through the "event operation type" metadata, the message specifies an action primitive concerning a data operation applicable to the service event indicated in the service specific data field. As such and as described above, a service application will use SDDP messages to reflect service events (i.e., service specific data) and a subscriber's intent with respect to this service event. A service agent may use the SDDP message to also specify service events/service data and the agent's intent with respect to this data (e.g., the agent may use it to invoke a desired reaction upon another agent).

Table 1 is a list of event operation types and response types we have currently defined and in particular, the possible response types for each event operation. Note that new operations can be added and existing ones removed/redefined depending on the implementation needs.

TABLE 1

| Event Operation Type | Interpretation | Possible Response Types |
|---|---|---|
| CREATE | Used by external service application to indicate to SPAS server the creation of a new service event (e.g., a subscriber schedules a new calendar appointment). Note: Create emanates from external service applications to the SPAS server | OK: Used by SPAS server to acknowledge the creation event (the event details are provided). NOT-UNDERSTOOD: Used by SPAS server to indicate it does not understand the event. DENY: Used by SPAS server to deny the event creation (the reason is provided). PENDING: Used by SPAS to indicate it is awaiting user interaction to resolve this event. |

TABLE 1-continued

| Event Operation Type | Interpretation | Possible Response Types |
|---|---|---|
| UPDATE | Used by external service application to indicate to SPAS server the update to an existing service event (e.g., subscriber updates the information in a calendar appointment) Note: Update emanates from external service applications to the SPAS server. | OK: Used by SPAS server to acknowledge the update event (the event details are provided). NOT-UNDERSTOOD: Used by SPAS server to indicate it does not understand the update event. DENY: Used by SPAS server to deny the update event (the reason is provided). PENDING: Used by SPAS to indicate it is awaiting user interaction to resolve this event. |
| COMMIT | Used by SPAS server components to instruct the receiver (which can be either another SPAS component or an external service application) to take the supplied service event details as 'final' and to commit this service event into the externally bundled service. (e.g., commit change to IM status). Note: Commit emanates between SPAS agents and from SPAS agents to external service applications. | OK: Used by receiver to indicate the event was successfully performed (the reason and event details are provided), NOT-UNDERSTOOD: Used by receiver to indicate it does not understand the event. DENY: Used by receiver to indicate the event is not allowed (the reason is provided). FAILED: Used by receiver to indicate the event could not be performed (the reason is provided). |
| QUERY | Used by SPAS server components to request information from the receiver (which can be either another SPAS component or an external service application) about service event validity (e.g., Is the scheduled appointment feasible?; Is the scheduled call feasible?). Note: Query emanates between SPAS agents and from SPAS agents to external service applications. | OK: Used by receiver to indicate the event was successfully performed (the reason and event details are provided), NOT-UNDERSTOOD: Used by receiver to indicate it does not understand the event. DENY: Used by receiver to indicate the event is not allowed (the reason is provided). FAILED: Used by receiver to indicate the event could not be performed (the reason is provided). |
| DELETE | Used by external service application to indicate to SPAS server that a previously existing service event has been removed (e.g., a calendar appointment has been removed). Note: Delete emanates from external service applications to the SPAS server | OK: Used by SPAS server to acknowledge the event successfully performed (the event details are provided). NOT-UNDERSTOOD: Used by SPAS server to indicate it does not understand the event. DENY: Used by SPAS server to indicate the event is not allowed (the reason is provided). FAILED: Used by SPAS server to indicate the event could not be performed (the reason is provided). PENDING: Used by SPAS to indicate it is awaiting user interaction to resolve this event. |

Turning to the SNCP protocol, it provides the communicative context to individual SDDP messages, which are typically the payload of SNCP messages. The SNCP part of the SPAS stack is also preferably an XML application but borrows, in principle and syntax, from the FIPA ACL (Foundation for Intelligent Physical Agents, Agent Communication Language). (Note that our invention is not specific to the SNCP protocol and other communication protocols that embody the concepts behind SNCP can be used. ACL is a language that is used in many agent systems to enable inter-agent, inter-platform communications. It achieves this by enforcing a particular message format, using a small set of fundamental communicative primitives, and treating message payloads as black boxes, putting the onus on the receiver to parse the payload if it is capable. The content of an SNCP message (i.e. data interchanged between agents within the SPAS server 100) is normally formulated as either a query or an informational message. As described above, when an SNCP message is conveying a service event, the payload of the message is preferably captured using the SDDP format. It should also be noted that service agents will use SNCP messages to communicate with the UPPA, for example. Here, either the SDDP format, or some other well structured protocol, can be used.

SPAS service agents implement the following FIPA communicative acts: INFORM, REFUSE, QUERY-IF, NOT-UNDERSTOOD, and FAILURE. Using these FIPA communicate acts, allowable communicative patterns (and therefore protocols) can be composed. Participants in the patterns must have a common understanding of the individual messages as well as the larger pattern. As such, using these communicative acts, possible interaction patterns and thereby possible behaviors of SPAS entities can be defined. For example, SPAS entities can be programmed to understand patterns such as: process the incoming service event (this would be a message pattern between the service bus agent and a principal service agent), query the UPPA for user preferences, query the UPPA for a peer group, complete/commit coordination and inform the subscriber. Table 2 summarizes the high level SNCP concepts, and the interpretation of the communicative act in the context of our invention.

TABLE 2

| FIPA Communicative Act | Interpretation in SPAS | Main Uses in SPAS |
|---|---|---|
| INFORM | The sender informs the receiver of information that is 'true'. (e.g. a subscriber has a new status on a particular IM service.) | Service Bus Agent messages to service agents regarding new service events. |
| REFUSE | The action of refusing to perform a requested action. (e.g. the requesting agent is not allowed to make the request). | Service agents refusing to perform actions from other service agents. |
| QUERY-IF | The action of asking another agent if a service event is 'feasible' or 'allowable' or asking for completion of missing details in an event. (e.g. asking an agent for a subscriber's current IM status). | Principal service agent querying peers for a subscriber's current status Service agent querying UPPA for subscriber preferences |
| NOT-UNDERSTOOD | The action of telling the sender of a message that the content of the message is not understood. | Service agent cannot parse a request from another agent |
| FAILURE | The action of telling the sender of a message that the request was attempted but failed. | Service agent attempted to query subscriber status but could not. |

The SNCP message is divided into two main parts: a header metadata for incorporating various communicative acts, and the data payload, which is the SDDP message in XML format or some other structured protocol. The header metadata essentially consists of: (i) the communicative act, (ii) the identity of the SPAS component sending the message, and (iii) a list of SPAS components that are to receive the message.

As can be seen from the SDDP and SNCP protocols, we have adopted an agent programming paradigm. As such, it is also preferable, although not necessary, that the SPAS server be supported by an agent platform, such as the Java Agent Development Environment available through Jade, for example. Such a platform facilitates, among other things, a message passing paradigm for moving these messages between SPAS components. If such a platform is not used, custom implementation of such functionality is needed.

The following example illustrates the interaction and operation of the SDDP and SNCP protocols. Assume a subscriber of a calendar service (CAL) enters a new appointment. Based on this service event, the calendar service application will generate an SDDP message with the event type set to "CREATE" and with the service specific data describing the service event. When this message arrives at the SPAS server, the service bus agent 306 captures it, determines through the agent directory 312 the principal service agent 318 proxying for the CAL service, forms an "INFORM" SNCP message (with the SDDP "CREATE" message and service specific data as the payload), and forwards this message to the principal service agent.

The principal service agent may need to determine the other service agents in the peer group for this bundled service and as such, will use a predefined communicative pattern of SNCP messages to communicate with the UPPA server to obtain this information (i.e., send a "QUERY-IF" SNCP message to the UPPA server with the payload of the SNCP message indicating the specific information desired). Once knowing the peers, the principal service agent proceeds to interact with the peer service agents on behalf of the subscriber to, for example, have these peer agents ascertain from their corresponding service applications a current status on the subscriber. To do this, the principal service agent uses a predefined communicative pattern of SNCP messages, here the "QUERY-IF" message (included in this message will be an SDDP message with the service event type set to "QUERY").

Upon receiving this message, each peer service agent will need to communicate with its corresponding external service application to determine current service specific data for the subscriber. Here, each service agent will create a "QUERY-IF" SNCP message with an embedded SDDP message, which has the event type filed set to "QUERY". This message is sent to the service bus agent, which removes the SNCP message wrapper, uses the agent directory to determine the exact service application, and then forwards the SDDP message to this application. The service application may respond with service specific data, which would be sent as an SDDP message with the response type set to "OK".

When this message arrives at the SPAS server, the service bus agent captures it, determines through the agent directory the service agent proxying for the service, forms an "INFORM" SNCP message (with the SDDP "OK" message as the payload), and forwards this message to the service agent. This service agent in turn will provide this information back to the principal service agent using an "INFORM" SNCP message. After this 'gathering' phase, the principal service agent determines the resulting action or, if no suitable result is reachable at this point and negotiation preferences are enabled in the subscriber's preferences, it modifies the event and re-queries the peer service agents (i.e., iterates). When the resulting action is finally determined the principal service agent uses the "INFORM" SNCP message with an SDDP operation set to "COMMIT" to tell the peer service agents and corresponding service applications to make the changes it requests permanently.

We turn now to the specific operation of the SPAS components. As indicated, the service bus agent 306 in conjunction with the agent directory 312, serves as the communications interface between the SPAS server 100 and the external service applications 320, and as a routing module for the SPAS server. The service bus agent uses the plurality of event interface and adaptation modules (EIA) 308a-b and the message queuing/routing module 310 to perform these functions.

Specifically for each service application 320 interfacing the SPAS server, there is a corresponding EIA module 308 that manages the actual interface between the server and application and shields the server 100 from the specifics of the service application. In particular, each service application may use a different network and transport layer protocols to communicate with the SPAS server. More importantly however, each service application may use different application layer protocols to communicate with the SPAS server. As indicated, the SPAS components preferably use the SDDP protocol when communicating and preferably the service applications also use the SDDP protocol when generating and receiving messages related to service events. However, service applications can use other application layer protocols to describe service events so long as they capture the semantics of service events. As such, the EIA module is responsible for mapping between the specific interface protocol and the SDDP protocol when conveying messages between the SPAS server and its corresponding application, thereby further shielding the server from the specifics of an application.

With respect to the SPAS server itself, each EIA module interfaces with the message queuing/routing module 310. As the name indicates, this module performs a routing and message queuing function for the server. Specifically, as a message enters the SPAS server through an EIA module, the module passes an SDDP form of the message to the message queuing/routing module for routing to an internal service agent. Similarly, as a service agent generates a message for an external service application, the message comes to the message queuing/routing module, which routes it to an appropriate EIA module for forwarding to a service application.

More specifically, external service applications have no knowledge of their corresponding service agents in the SPAS server. This is true whether an application is generating an initial service event or whether an application is responding to a query message from a service agent. As such, as SDDP messages enter an EIA module and are forwarded to the message queuing/routing module for routing, the module must first determine which service agent proxies for the application. The module uses the agent directory 312 to perform this function. Entries from an exemplary agent directory are shown in Table 3. As shown by the first three columns, this directory maintains a mapping between a service provider ID and service ID (both of which are metadata within the SDDP header) to a SPAS service agent ID to allow an association between external service applications and internal service agents for the purpose of routing external messages to the appropriate service agents. As such, as the message queuing/routing module receives an SDDP message, it queries the agent directory and determines the service agent. Once knowing the intended service agent, the message queuing/routing module wraps the SDDP message in an SNCP message and forwards the SNCP to the agent (possibly queuing the message also).

Similarly, as indicated, service agents will communicate messages back to their corresponding service applications, which messages also pass through the message queuing/routing module. However, here again the service agents have no specific knowledge of their corresponding service applications from a communications standpoint. As such, as these messages enter the message queuing/routing module, it must determine how to communicate with these applications, including determining which EIA module is responsible for the application. Accordingly, as a message enters the message queuing/routing module 310, the module first removes the SNCP wrapper to reveal the SDDP message and then determines the appropriate EIA module 308. Again, the message queuing/routing module uses the agent directory 312 for this purpose.

As shown by the last three columns in Table 3, the agent directory also maintains for each service application the actual server address of the server that is responsible for the interaction with the SPAS server, the protocols used for communications between the SPAS server and the service application, and the types and identification of the EAI module used for interfacing with the service. Accordingly, the message queuing/routing module routes the message to the appropriate EAI module, which then forwards it to the service application.

TABLE 3

| Service Provider ID | (External) Service ID | (Internal) SPAS Agent ID | SPAS EIA ID | External Endpoint/ Server Address | Comm. Paradigm |
|---|---|---|---|---|---|
| AOL | AIM | AOL.AIM | IM | IMserver.AOL.com | HTTP |
| Yahoo | Yahoo!Msgr | Yahoo.IM | IM | IM.Yahoo.com | HTTP |
| KT | CM | KT.CM | CM | AppServer.kt.co.kr | SDDP |
| EnterpriseX | Calendar | EnterpriseX.Cal | CAL | enterprisex.com | RMI |
| Yahoo | Yahoo!Calendar | Yahoo.Cal | CAL | cal.yahoo.com | HTTP |

Turning to the UPPA 314, as discussed, through the profile and subscription database 316, it maintains the notion of peer groups for the determination of which services comprise a bundled service and maintains reference and profile information for each subscriber who subscribes to a bundled service. Service agents will query the UPPA (using SNCP messages) for this information and the UPPA will respond if it understands the query. Recall that both subscribers and service providers can access the UPPA to change their preferences and system information.

Beginning with peer groups, recall that they are simply a logical association between instances of service agents and are used to describe a set of service applications that are bundled. A service agent may belong to zero or more groups, which can be formed based on any number of affinities. For example, one way to form groups is based on subscribers. In other words, a group corresponds to all service agents representing services subscribed to by a given subscriber (e.g. subscriber-driven). Other ways to create groups include grouping service agents based on service applications of the same 'type' (e.g. service-driven) and grouping service agents based on service data types (i.e., the corresponding service applications manipulate service data of the same type).

Using the subscriber-driven approach as an example, there would exist a group for each subscriber to SPAS service bundling, and the service agent members of this group would correspond to the external services that are to be bundled for the subscriber. Table 4 shows example entries of the profile and subscription database from which peer groups can be derived using the subscriber-driven approach. The entries show bundled services from possibly different providers subscribed to by a subscriber. Here, there are two peer groups, each designated through the SPAS subscriber IDs: "SPAS User 1" and "SPAS User 2" (i.e. there is an association between a SPAS subscriber (using a unique SPAS Subscriber ID) and a subscribed service (using the Service ID) and a provider (Using the Provider ID)). By querying the profile and subscription database, a principal service agent can determine the service applications in its peer group. (Note that there is also service specific information here (i.e., the subscriber ID), which a peer service agent may need to know in order to communicate with its corresponding service application). Then, using the agent directory 312, the principal service agent can determine the service agents proxying for these services. Note that by this (and other) definitions the members of a group may change dynamically, and the group itself may be dynamically destroyed (e.g. subscriber opts out of SPAS) or created (e.g. subscriber joins SPAS).

TABLE 4

| SPAS Subscriber ID | Service ID (Subscribed Services) | Provider ID | Subscriber ID |
|---|---|---|---|
| SPA User 1 | AOL.IM | AOL | john@AOL.com |
| SPA User 1 | KT.CM | KT | 02-555-9999 |
| SPA User 1 | Yahoo.Cal | Yahoo | john24@Yahoo.com |

TABLE 4-continued

| SPAS Subscriber ID | Service ID (Subscribed Services) | Provider ID | Subscriber ID |
|---|---|---|---|
| SPA User 2 | Yahoo.IM | Yahoo | jim@Yahoo.com |
| SPA User 2 | KT.CM | KT | 02-333-1111 |

Turning to the preference information of the UPPA 314, this information is maintained for each subscriber and is used by the service agents when performing service bundling. In particular, when service agents are acting upon a service event or two or more service agents encounter a conflict with respect to a particular event, the service agents will use this information to process the event according to a subscriber's preference. Table 5 shows exemplary entries from the profile and subscription database for subscriber preference information. In this example, the database maintains the "update preference" of a subscriber based on permission and based on the ranking of services. With respect to permission, "User 1" disallows any update to the CM (Call Management) service by other services. For instance, if subscriber sets the AOL IM service to busy, the service agents will update the status of the other services the "User 1" subscriber subscribes to except for the CM service, which will remain unaffected. Alternatively, in the ranking based update, the lower priority services (higher ranking number) are not allowed to update higher level priority services (lower ranking number). In this example, any update request from the Enterprise calendar service (CAL) is not allowed to update other services in the peer group. However, an update request from the CM service is allowed to affect all other services except the IM service from AOL. Of course these preferences (i.e., permission or ranking) could also be used for other purposes as long as it does not create inconsistency as perceived by the subscriber.

TABLE 5

| SPAS Subscriber ID | Service ID (Subscribed Services) | Provider ID | Update Permission | Service Ranking |
|---|---|---|---|---|
| SPA User 1 | AOL.IM | AOL | Y | 1 |
| SPA User 1 | KT.CM | KT | N | 2 |

TABLE 5-continued

| SPAS Subscriber ID | Service ID (Subscribed Services) | Provider ID | Update Permission | Service Ranking |
|---|---|---|---|---|
| SPA User 1 | Yahoo.Cal | Yahoo | Y | 3 |
| SPA User 1 | Yahoo.IM | Yahoo | Y | 4 |
| SPA User 1 | Enterprise.Cal | Enterprise | Y | 5 |

Finally, turning to the service agents 318, as indicated they are proxies for external service applications and perform the service integration. Through the service bus agent 306 and agent directory 312, each service agent has a relationship to at least one EIA module 308 and uses this module for communicating with the service application 320 for which it proxies.

A service agent's role changes over time between the two possible roles: a principal service agent and a peer service agent. The agent will contain logic for both roles. In particular, as a principal service agent, the agent is the first to receive an initial service event from a service application. In this role, the service agent becomes the main instigator in the subsequent SNCP interactions. Here, the service agent will determine the peer agents, query these agents for subscriber status, and based on these queries determine a resolution and possibly instruct the peer agents to commit a new status. Recall that the peer service agents are the set of service agents that are members of the same peer group as the principal service agent. In the peer role, the service agent receives SNCP queries from service agents in the principal service agent role. Based on these queries, the agent will, for example, communicate with its service application to determine subscriber status. The agent may also receive commit commands from the principal service agent, instructing the agent to again communicate with its service application to commit a new status.

As described, in order to make decisions during SNCP interactions with peers, service agents may query the UPPA to take the preferences of the subscriber or service provider into account. As further discussed below, the service agent may also put the decision into a "pending" status and await user response for resolution if direct user interaction with SPAS server is available.

It should be noted that service agents can be programmed generically, such that a given set of logic is used across several service agents. Such a configuration may be applicable when the type of service data in question is the same across the applications (e.g., each application is concerned with time).

It should be further noted that thus far, we have essentially indicated that there is a one-to-one mapping between service agents and service applications. While this is one possible deployment of SPAS, this is not the only deployment. More specifically, a given instantiation of a service agent can also map to multiple service applications. In other words, each service application has a corresponding service agent within the SPAS server as described above; however, more than one application may map to a give service agent. (Here, there is an EIA module for each service application and these modules each communicate with the given service agent). Importantly, it should be noted that when using this configuration, the service applications that map to the single service agent may be within the same service provider or across service providers. In addition, the service applications may be of the same type (e.g., all instant messaging applications) or of different types. Such a configuration is applicable when the type of service data in question is the same across the applications (e.g., each application is concerned with time).

Figure 4:
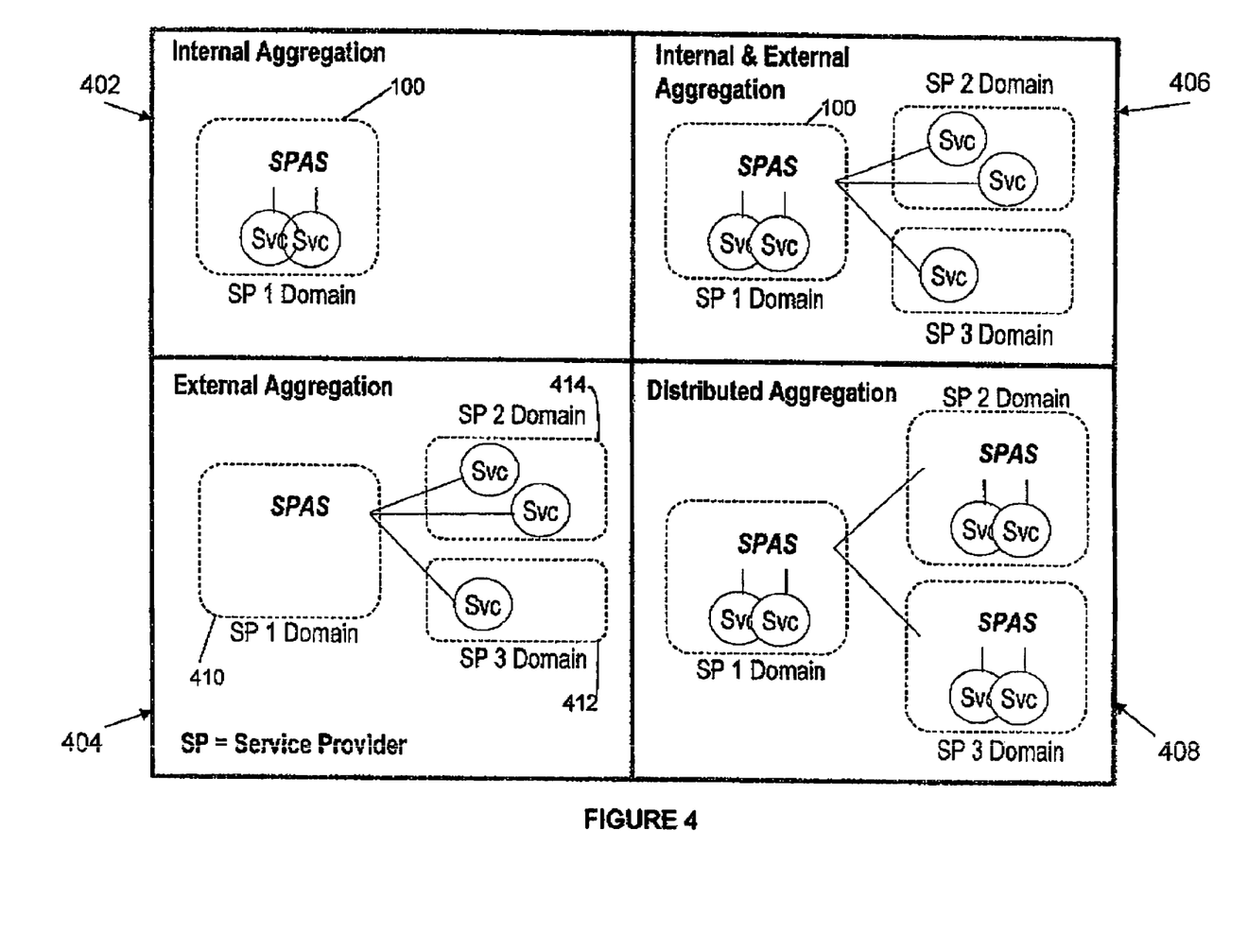
FIG. 4 shows exemplary functional deployments of our system for bundling distributed service applications.

It should also be noted that as described above, the SPAS server 100 provides integration for service applications both within and between service providers. More specifically, our invention lends itself to one of several possible functional deployments, as shown in FIG. 4. Communications between SPAS components in these deployments is made possible when the SPAS server 100 is supported by an agent platform, such as the Java Agent Development Environment. As shown in functional deployment 402, our invention can be deployed as purely internal, in which a service provider utilizes a SPAS server 100 to provide value to subscribers through aggregating the services in its own domain. As shown in functional deployment 404, our invention can also be deployed as totally external in which a service provider 410 acts as a virtual provider where it does not own any services and all its component offerings are from third parties 412 and 414. As shown in functional deployment 406, a service provider may also be involved in peering relationships with other service providers. In this case, an internal and external aggregation scenario applies in which a SPAS server 100 aggregates third party services in addition to its own internal ones. Finally, as shown in functional deployment 408, a fully distributed aggregation scenario is possible where all participating service providers have a full SPAS implementation.

Reference will now be made to a second embodiment of our invention where the SPAS server further comprises a "user agent", which allows any given service agent of a bundled service to interact with a subscriber, particularly when the service agent requires user intervention before completing a service. An example of such an intervention is in a situation where conflicts cannot be resolved automatically with pre-defined user preferences (via UPPA), such as overlapping time schedules that may occur amongst a set of bundled services. The types of user interaction may range from a pure notification about conflicts, offline actions that need to be taken by a subscriber, or real-time interaction with a subscriber. The exact subscriber interaction undertaken by the user agent can range from a simple notification message, such as email, to a real-time interactive response, such as Web interfaces on a cell phone.

More specifically, the user agent acts as the intermediary between service agents of the SPAS server and subscribers, allowing a service agent to query a subscriber for input that can subsequently be used by the service agent to make decisions. Accordingly, the user agent also maintains the 'state' of interactions (e.g. has subscriber responded to a previous notification initiated by the user agent on behalf of a service agent) between subscribers and their bundled services on the SPAS server. Lastly, the user agent also has the specific ability to locate and 'reach' a subscriber, which information can be maintained by the UPPA in the subscriber and preference database.

As such, when a service agent needs subscriber input, it will use a generic SNCP query pattern with the user agent. More specifically, the service agent will send the user agent an SNCP "QUERY-IF" message instructing the user agent to notify the subscriber of an event. The user agent can then wait for a response from the subscriber (such as through a web interface on a cell phone or PDA), providing that response back to the service agent. If no response is timely received, the user agent can timeout, notifying the service agent that the query failed. Similarly, the user agent can simply notify the subscriber of an event and not wait for a response. Here, the subscriber may respond by directly interacting with the appropriate services, which in turn interact with the service agents through SDDP messages as described above. As such, as described, the user agent will maintain the state of interaction with the subscriber.

The above-described embodiments of our invention are intended to be illustrative only. Numerous other embodiments may be devised by those skilled in the art without departing from the spirit and scope of our invention.

We claim:

1. A system comprising:
   at least one computing device in communication with one or more service provider domains, the at least one computing device comprising:
      a plurality of service agents, individual ones of the service agents corresponding to one or more service applications located within the one or more service provider domains, and two or more of the plurality of service agents are configured to autonomously intercommunicate to bundle corresponding one or more service applications,
      a service bus agent configured to route messages between the one or more service applications and the plurality of service agents, and
      a user preference and profile agent configured to maintain one or more peer groups comprising a set of associated service agents of the plurality of service agents to define a bundled service,
   wherein the service bus agent is configured to receive a service event from at least one of the one or more service applications located within the one or more service provider domains,
   wherein the service bus agent is configured to forward the service event to a primary service agent of the plurality of service agents, the primary service agent corresponding to the at least one of the one or more service applications,
   wherein the primary service agent is configured to communicate with the user preference and profile agent to obtain at least one of the one or more peer groups in response to receipt of the service event, and
   wherein the primary service agent and the at least one of the one or more peer groups of service agents are configured to, in response to receipt of the service event, autonomously intercommunicate to bundle the one or more service applications by updating service specific data of the one or more service applications corresponding to the primary service agent and the at least one of the one or more peer groups of service agents.

2. The system of claim 1 wherein the service event comprises service specific data and information regarding an intent for use by the at least one of the one or more service applications with respect to the service specific data.

3. The system of claim 1 wherein the two or more of the plurality of service agents proxy for the one or more service applications.

4. A method comprising:
   a service bus agent at a computing device receiving a service event from a service application of one or more service applications, the service application located within at least one service domain in communication with the computing device,
   the service bus agent determining a primary service agent that corresponds to the service application and forwarding the service event to the primary service agent,
   the primary service agent obtaining a peer group of service agents that correspond to one or more service applications from a user preference and profile agent based at least in part on the service event, and
   the primary service agent and the peer group of service agents autonomously intercommunicating to bundle the one or more service applications by updating service specific data of at least one of the one or more service applications corresponding to the primary service agent and the peer group of service agents.

5. The method in accordance with claim 4 wherein the service event comprises service specific data and the service application's intent with respect to the service specific data.

6. A method comprising:
   one or more computing devices comprising one or more servers in communication with at least one service domain receiving data along with a subscriber's intent with respect to the data from at least one service application of one or more service applications, the at least one service application located within the at least one service domain,
   at least one of the one or more computing devices comprising one or more servers in communication with at least one service domain identifying a primary service agent as a proxy for the at least one service application,
   the primary service agent determining a peer group of service agents, wherein the peer group of service agents comprises at least one service agent corresponding to at least one other service application of the one or more service applications that together with the at least one service application define a bundled service,
   the primary service agent and the peer group of service agents coordinating with respect to the data and the subscriber's intent with respect to the data from the at least one service application; and
   the primary service agent and the peer group of service agents communicating with their respective corresponding service applications to at least one of determine or update the subscriber's service specific data configurations.

7. The method in accordance with claim 6 wherein the primary service agent and the peer group of service agents coordinate with respect to the primary service agent's determinations of preferences of the subscriber prior to communicating with their respective corresponding service applications to at least one of determine or update the subscriber's service specific data configurations.

8. The method in accordance with claim 6 wherein the primary service agent and the peer group of service agents communicate with their respective corresponding service applications to at least one of determine or update the subscriber's service data configurations to affect behaviors of the service applications.

9. An apparatus configured to bundle one or more service applications to create a new service, the apparatus comprising:
   at least one computing device in communication with at least one service domain, the at least one computing device comprising a service peering and aggregation server comprising:
      a plurality of service agents configured to serve as proxies for one or more service applications and to autonomously communicate with each other to bundle the one or more service applications by updating service specific data of the one or more service applications to create a new service,
      a user preference and profile agent configured to maintain preference profile information for each subscriber who subscribes to the service peering and aggregation server, and a service bus agent comprising a plurality of event interface and adaptation modules and a message queuing and routing module.

10. The apparatus of claim 9 further comprising an agent directory interface within the service bus agent.

11. The apparatus of claim 9 further comprising a profile and subscription database configured to interface with the user preference and profile agent.

12. The system in accordance with claim 1 wherein the bundled service comprises an aggregate of the one or more service applications.

13. The method in accordance with claim 4 wherein the autonomously intercommunicating to bundle the one or more service applications comprises aggregating the one or more service applications.

14. The system in accordance with claim 1 wherein the one or more peer groups are configured to change dynamically.

15. The method in accordance with claim 4 wherein the peer group of service agents changes dynamically.

16. The apparatus of claim 9 wherein the service peering and aggregation server is supported by an agent platform configured to facilitate a message passing paradigm.

17. A system configured to bundle one or more service applications to create one or more bundled services, the one or more service applications located within one or more service provider domains, the system comprising:
    at least one computing device in communication with the one or more service domains, the at least one computing device comprising:
        a plurality of service agents corresponding to the one or more service applications;
        a service bus agent configured to route messages between the one or more service applications and the plurality of service agents; and
        a user preference and profile agent configured to maintain one or more peer groups, individual peer groups comprising a set of the one or more service agents associated to define one of the one or more bundled services,
    at least one service provider domains operating at service provider domain computing devices, the at least one service provider domain comprising one or more service applications located within the at least one service provider domain, wherein at least one of the one or more service applications is configured to generate and send a service event to the service bus agent in response to which the service bus agent is configured to forward the service event to a primary service agent of the plurality of service agents,
    wherein the primary service agent is configured to communicate with the user preference and profile agent to obtain a peer group of service agents corresponding to the one or more service applications, and
    wherein the primary service agent and the peer group of service agents, in response to the service bus agent forwarding the service event to the primary service event, are configured to autonomously intercommunicate to create at least one of the one or more bundled services by updating service specific data of the one or more service applications, the at least one bundled service of the one or more bundled services comprising an aggregation of the one or more service applications corresponding to the primary service agent and the peer group of service agents.

18. An apparatus comprising:
    a means for receiving data and a service event intent with respect to the data from at least one service application,
    a means for identifying at least one primary service agent as a proxy for the at least one service application,
    a means for determining a peer group of service agents in response to receiving the data and the service event intent with respect to the data, wherein the peer group of service agents corresponds to service applications that together define a bundled service, and
    a means for communicating with service applications corresponding to the primary service agent and the peer group of service agents to at least one of determine or update service data configurations based at least in part on the service event intent.

19. The apparatus of claim 18 further comprising a means for coordinating the primary service agent and the peer group of service agents with respect to the data prior to communicating with the service applications corresponding to the primary service agent and the peer group of service agents to at least one of determine or update the service data configurations.

20. The apparatus of claim 19 further comprising a means for coordinating the primary service agent and the peer group of service agents with respect to the primary service agent's determinations of preferences prior to communicating with the service applications corresponding to the primary service agent and the peer group of service agents to at least one of determine or update the service data configurations.

21. The apparatus of claim 19 wherein the means for communicating with the service applications corresponding to the primary service agent and the peer group of service agents to at least one of determine or update the service data configurations further comprises updating the service data configurations to affect behaviors of at least one of the service applications corresponding to the primary service agent and the peer group of service agents.

* * * * *